Patented June 21, 1927.

1,633,123

UNITED STATES PATENT OFFICE.

RALPH A. NELSON, OF BUFFALO, NEW YORK, ASSIGNOR TO NATIONAL ANILINE & CHEMICAL COMPANY, INC., OF NEW YORK, N. Y., A CORPORATION OF NEW YORK.

PRODUCTION OF BENZIDINE AND DERIVATIVES.

No Drawing.   Application filed June 22, 1920. Serial No. 390,887.

This invention relates to the production of compounds of the benzidine series from the corresponding hydrazo compounds, by an operation commonly known as rearrangement. The invention is applicable, for example, to the conversion of hydrazobenzene $$(C_6H_5NH-NHC_6H_5)$$

to benzidine $$(NH_2-C_6H_4-C_6H_4-NH_2)$$

or of hydrazotoluene to tolidine or of hydrazanisol to dianisidine (4-4'-diamino-3-3'-dimethoxydiphenyl).

The present invention is based upon the discovery that the rearrangement of hydrazo compounds to the corresponding compounds of the benzidine series can be carried out with particular advantage by subjecting the hydrazo compound, dissolved in an organic solvent immiscible with water, to the action of strong hydrochloric acid of appropriate strength and amount such that the benzidine compound is obtained directly in a solid state which can be readily separated from the solvent, all as more fully hereinafter described.

In the practice of the invention, the hydrazo compound in an isolated state may be dissolved in a suitable solvent, such as benzene or toluene, or there may be used a solution of the hydrazo compound otherwise produced, for example, a solution such as is obtained by extraction of the hydrazo compound from admixture with zinc oxide residue, as described in applications Serial Nos. 390,884 and 390,885, filed June 22, 1920.

According to the present invention the hydrazo compound. dissolved in the organic solvent, is subjected to the action of hydrochloric acid of appropriate strength and amount so that the benzidine compound is directly obtained, in the form of its hydrochloride, in a solid state, well adapted for separation from the solvent and for recovery of the benzidine compound in a state of high purity. By proper regulation of the strength and amount of hydrochloric acid used, and by the use of a suitable organic solvent for the hydrazo compound, the formation of emulsions, difficult to handle, can be avoided, and the benzidine compound obtained directly in a solid form, rather than in the form of a solution, thus very materially facilitating its separation and isolation.

The strength of the hydrochloric acid employed is capable of some variation, but it should be relatively concentrated e. g. 13–25.5° Bé., which will be referred to in the claims as strong hydrochloric acid. Ordinary concentrated hydrochloric acid is well adapted for use. When concentrated hydrochloric acid is thus used, the amount of acid required for the rearrangement is relatively small. Also the formation of emulsions and other difficulties in the separation of the benzidine compound, such as are attendant upon the use of a weaker acid and the dissolving of the hydrochloride formed by an excess of water or dilute acid, are avoided or minimized.

The solvent used for the hydrazo compound, and in the presence of which the rearrangement takes place, is preferably and advantageously benzene owing to its increased solvent action and its low boiling point. Toluene can be similarly used although with somewhat less advantage. Higher boiling solvents, such as xylene, solvent naphtha, etc., can also be used, but are less advantageous and are less to be recommended.

The invention will be further illustrated by the following specific description:

*Production of benzidine.*—300 parts by volume of a benzene solution of hydrazobenzene, containing about 10% of hydrazobenzene, are cooled to about 8° C., and 36 volumes of concentrated hydrochloric acid are gradually added, with vigorous agitation and while holding the temperature at about 9 to 13° C. The hydrochloric acid is run in slowly, the rate depending upon the cooling effect of the cooling means employed. The complete addition of the acid may thus require a considerable period of time. The addition of the concentrated hydrochloric acid results in the rearrangement of the hydrazobenzene to benzidine, which separates out in the form of benzidine-hydrochloride as a more or less stiff paste. After all the acid has been added, the agitation is continued for a further period to insure completion of the rearrangement.

When the operation is completed, the benzidine-hydrochloride separates and settles as a paste, holding but a small amount of the benzene, the greater portion of the benzene forming a separate layer above the paste. The character of the paste is such that the benzol liquor can be readily separated by decantation, and the benzidine hydrochloride can be similarly washed by adding further amounts of benzol, permitting the paste to settle after each washing, and removing the benzol by decantation. The washings are repeated until the benzene solution obtained has but little color. The benzene can be recovered from the benzene mother liquor by distillation, or it can be used for dissolving further amounts of hydrazobenzene to be subsequently subjected to rearrangement.

After washing of the benzidine-hydrochloride with the solvent, it is then dissolved in water to form a saturated solution, and converted into the sulfate by adding a concentrated sodium sulfate solution to the aqueous solution, thereby precipitating the benzidine as sulfate. This sulfate is then separated by filtration and washed with water. The benzidine can thus be obtained in the form of the benzidine sulfate which can be directly used or can be converted into the free base by boiling with water and precipitating with caustic alkali from the hot solution.

Instead of using benzene as the solvent, other solvents, such as toluene, can be used. So also, other benzidine compounds than benzidine itself can be produced in a similar manner from the corresponding hydrazo compounds. Hydrazotoluene can thus be converted to tolidine, hydrazanisol can be converted to dianisidine; etc.

From the foregoing description it will be seen that the benzidine compound is obtained directly, in a state of high purity, and with good yields, from solutions of hydrazo compounds in organic solvents, the rearrangement being carried out in the presence of the solvent and the benzidine compound being separated directly in a solid state as hydrochloride, which hydrochloride can be subsequently converted with advantage to sulfate.

I claim:

1. The method of producing compounds of the benzidine series from hydrazo compounds, which comprises subjecting a solution of the hydrazo compound in an organic solvent immiscible with water to the action of strong hydrochloric acid of appropriate strength and amount to effect the formation and separation of the benzidine compound in an aqueous paste containing the hydrochloride in a solid form, and separating the solvent.

2. The method of producing compounds of the benzidine series from hydrazo compounds, which comprises subjecting a solution of the hydrazo compound in an organic solvent immiscible with water to the action of a sufficient amount of concentrated hydrochloric acid, to separate out the benzidine compound as the hydrochloride in the form of a paste.

3. The method of producing compounds of the benzidine series from hydrazo compounds, which comprises gradually adding a sufficient amount of concentrated hydrochloric acid to a solution of the hydrazo compound in an organic solvent immiscible with water with vigorous agitation, to separate out the benzidine compound as the hydrochloride in the form of a paste.

4. The method of producing compounds of the benzidine series from hydrazo compounds, which comprises subjecting a solution of the hydrazo compound in an organic solvent immiscible with water to the action of strong hydrochloric acid of appropriate strength and amount to effect the formation and separation of the benzidine compound as a hydrochloride in the form of a paste, and separating the solvent from the paste by decantation.

5. The method of producing benzidine from hydrazobenzene, which comprises subjecting a solution of hydrazobenzene in an organic solvent immiscible with water to the action of strong hydrochloric acid of appropriate strength and amount to effect the formation and separation of the benzidine in an aqueous paste containing the hydrochloride in a solid form and separating the solvent.

6. The method of producing benzidine from hydrazobenzene, which comprises gradually adding a sufficient amount of concentrated hydrochloric acid to a solution of hydrazobenzene in a solvent of the benzene series at a regulated temperature of about 9 to 13° C. and with vigorous agitation, to separate out the benzidine compound as the hydrochloride in the form of a paste.

7. The method of producing benzidine from hydrazobenzene which comprises gradually adding about 36 parts of concentrated hydrochloric acid to about 300 parts of a 10% solution of hydrazobenzene in a solvent of the benzene series with vigorous agitation, whereby benzidine separates out as the hydrochloride in the form of an aqueous paste.

8. The method of producing benzidine from hydrazobenzene which comprises gradually adding about 36 parts of concentrated hydrochloric acid to about 300 parts of a 10% solution of hydrazobenzene in benzene with vigorous agitation, whereby benzidine separates out as the hydrochloride in the form of an aqueous paste.

9. The method of producing benzidine from hydrazobenzene which comprises gradually adding about 36 parts of concentrated hydrochloric acid to about 300 parts of a 10% solution of the hydrazobenzene in a solvent of the benzene series at a temperature of 9 degrees to 13 degrees C. with vigorous agitation whereby benzidine separates out as the hydrochloride in the form of an aqueous paste.

10. The method of producing benzidine from hydrazobenzene which comprises gradually adding about 36 parts of concentrated hydrochloric acid to about 300 parts of a 10% solution of hydrazobenzene in benzene, at a temperature of 9 degrees to 13 degrees C. with vigorous agitation, whereby benzidine separates out as the hydrochloride in the form of an aqueous paste.

11. As a product, a mixture of benzene and a stiff paste of benzidine hydrochloride and hydrochloric acid.

12. In the production of a compound of the benzidine series by subjecting a hydrazo compound to the action of strong hydrochloric acid in presence of an organic solvent immiscible with water, the improvement which comprises the employment of an amount of said acid sufficient to effect formation and separation of the benzidine compound as a paste containing the hydrochloride in a solid form.

13. In the production of a compound of the benzidine series by rearranging a hydrazo compound, the improvements which comprise subjecting the compound to the action of a sufficient amount of strong hydrochloric acid in the presence of benzene to effect the formation and separation of the benzidine compound as a paste containing hydrochloride in a solid form.

14. In the production of benzidine by subjecting hydrazobenzene to the action of strong hydrochloric acid in presence of an organic solvent immiscible with water, the improvement which comprises the employment of an amount of said acid sufficient to effect formation and separation of the benzidine as a paste containing the hydrochloride in the solid form.

15. In the production of benzidine by subjecting hydrazobenzene to the action of strong hydrochloric acid, the improvement which comprises the employment of an amount of said acid in the presence of benzene sufficient to effect the formation and precipitation of the benzidine as the hydrochloride in the solid form.

16. As a product, an organic solvent immiscible with water in conjunction with benzidine hydrochloride in the solid state and hydrochloric acid.

17. As a product, a hydrocarbon solvent immiscible with water in conjunction with benzidine hydrochloride in the form of paste and hydrochloric acid.

In testimony whereof I affix my signature.
RALPH A. NELSON.